May 27, 1930.　　　W. MILLER　　　1,760,708

ROLLER CLUTCH

Original Filed Feb. 3, 1927

Inventor:
William Miller.
by R. Haddam
Attorney.

Patented May 27, 1930

1,760,708

UNITED STATES PATENT OFFICE

WILLIAM MILLER, OF DUNSTON-ON-TYNE, ENGLAND

ROLLER CLUTCH

Original application filed February 3, 1927, Serial No. 165,668, and in Great Britain February 17, 1926. Divided and this application filed June 21, 1928. Serial No. 287,232.

This invention relates to roller clutches and is a division of my prior application Serial No. 165,668, filed February 3rd, 1927, now Patent No. 1,735,125, granted November 12, 1929. The invention relates to roller clutches wherein one of the clutch members (hereinafter referred to as the "roller-carrying member") has associated therewith one or more roller units each comprising an even number of rollers arranged in a line substantially transverse of the direction of movement of the clutch members, the said rollers co-operating with a cam or wedge surface, so that when one of the clutch members is moved a virtual toggle action occurs between the rollers and clutch members, with a consequent effective engagement.

The object of the invention is to provide a modified form of clutch which may be made to operate in either direction without throwing any of the elements out of action.

The working faces of the clutch members are parallel, and in the present invention the cam or wedge surface is in the form of a separate wedge member having two wedging surfaces disposed reversely to one another, this wedge member being movable with its respective roller unit, but at the same time capable of a small movement relatively to the latter in either direction. The said wedge member is preferably spring pressed against its adjacent roller in order to obviate play between the members, and means are provided to cause one or the other of its wedge surfaces to be operative, according as the clutching action is to take place in one or the other direction.

The invention will now be described with reference to the accompanying drawing in which—

Figure 3:
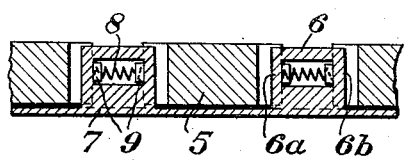
Fig. 3 is a development showing the arrangement of the wedges and control of the clutch shown in Fig. 1.

Referring more particularly to the drawing, 1 indicates the roller-carrying member of the clutch, which takes the form of an annulus, and 2 the other clutch member which is of channel-section; the member 1 being adapted to oscillate in the channel, the side walls of which constitute a pair of spaced, concentric flanges. Pairs of circumferentially-contacting rollers 3 and 4 are positioned in radial slots or cavities $1^a$ formed in the roller-carrying member 1, each outer roller 3 contacting with a double-acting wedge 5 having the neutral portions of its cam surfaces in the middle, the said surfaces sloping symmetrically on either side of the mid-portion towards the axis of the clutch mechanism. The ends of the wedges are slotted to receive abutments 6 on the reversing or control ring 7. Each of said abutments is slotted, as shown, to receive a spring 8 the ends of which fit into cups 9 which abut against the ends $6^a$, $6^b$ (Fig. 3) of the slot and against the ends of adjacent wedges. In this form, movement of the reversing ring 7 to one position has the effect of compressing each of the springs 8 between one of the ends of a wedge 5 and one of the abutments $6^a$, $6^b$, so that the wedges tend to move in the one direction when free, while movement of the said ring to the other position compresses the springs between the other ends of the wedges and the other of the abutments $6^a$, $6^b$, so that the wedges tend to move in the opposite direction when free. Thus the single clutch mechanism is rendered reversible without rendering any of the members inoperative.

Figure 1:
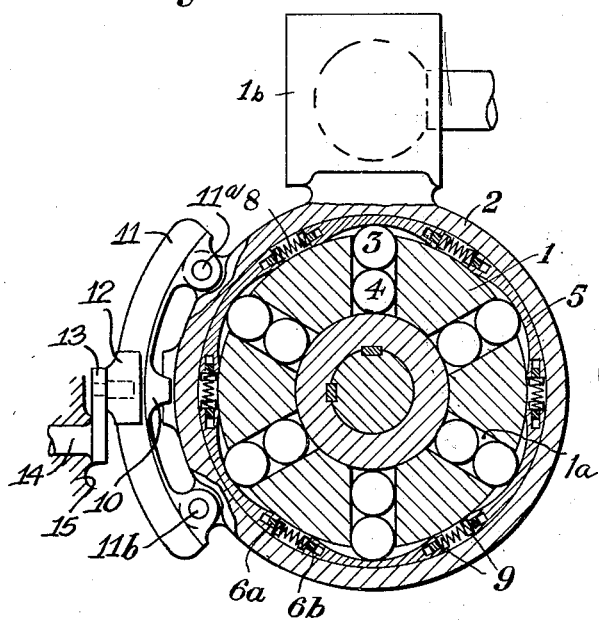
Fig. 1 is a sectional elevation of a form of reversing clutch according to the present invention adapted for use with a swash plate variable gear, a pair of clutches being employed.
Figure 2:
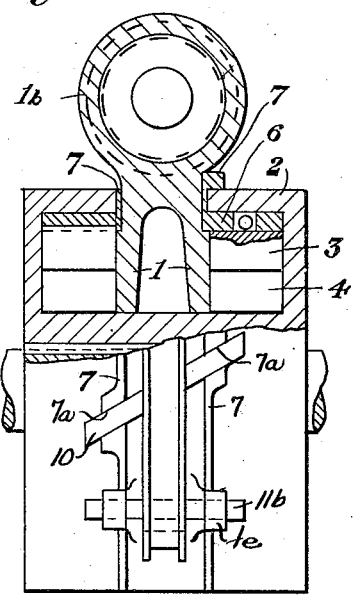
Fig. 2 is a side view of Fig. 1.

According to the arrangement shown in Figs. 1 and 2, a pair of such clutches may be combined, the members 1 being rigidly connected to a socket member $1^b$ which is connected by a connecting rod to the variable gear.

The control rings 7 are so disposed that when one of them is in no-drive position, the other is in driving position. A diagonal groove is formed in each of the control rings at $7^a$, $7^a$, with which a diagonal cam member 10 engages. The said cam member 10 is rigid with a grooved segmental member 11 mounted on pins $11^a$, $11^b$, to slide in eyes formed in lugs $1^e$ on the driving member 1. A slipper 12 pivotally mounted on a lever arm 13 (Fig. 1) engages in the groove of the segment 11. The arm 13 is mounted on or is integral with a shaft 14 supported in the casing 15 of the gear mechanism (not shown), the said shaft being connected by suitable linkage mechanism to a lever adjacent the operator's position.

It will be seen that movement of the reversing lever will cause the arm 13, slipper 12 and, with them, the cam 10 to move transversely to the clutch, so that the control rings are moved angularly relatively to the clutch driving member 1.

I claim:

1. A roller clutch comprising two members, an even number of circumferentially contacting rolling elements arranged in one of said members substantially transverse to the direction of movement of the clutch members, a pair of flanges on the other clutch member, said flanges embracing the outer of said rolling elements, wedges cooperating with said rolling elements, each of said wedges having oppositely disposed wedge faces and a neutral portion, and means for moving the wedges relatively to the said rollers so that the latter may be made to engage either wedge face according to the direction in which the driven clutch member is to operate.

2. A clutch comprising a disc having two concentric flanges thereon, an annulus disposed between said flanges and having a plurality of substantially-radial cavities therein, an even number of circumferentially-contacting rolling elements located in each of said cavities, a plurality of double-acting wedges adapted to slide between one of the disc flanges and the annulus, each of which wedges has its inclined face adapted to abut against one of the rolling elements in one of said cavities, and means for controlling said wedges so as to change the operation of the clutch.

3. A clutch according to claim 2 wherein the wedges are slotted at their ends, a control ring normally movable with the wedges, slotted abutments on said control ring said abutments being adapted to engage in the slots in the wedges, springs in the abutment slots having their ends adapted to abut against the ends of the wedges, and means for imparting movement to the said ring to move the wedges relatively to their rolling elements.

4. A clutch according to claim 1 wherein the neutral portion of the wedge surfaces of a wedge are in the middle of the wedge.

5. A clutch according to claim 1 wherein the neutral portion of the wedge surfaces of a wedge is in the middle of the wedge and slopes symmetrically on each side towards the axis of the clutch mechanism.

6. A clutch according to claim 1, in which the wedge-moving means comprises a reversing ring.

In witness whereof I have signed this specification.

WILLIAM MILLER.